United States Patent
Poscic et al.

(10) Patent No.: US 12,101,380 B2
(45) Date of Patent: Sep. 24, 2024

(54) CUPS BNG BASED PACKET FORWARDING SYSTEMS, METHODS AND NON-TRANSITORY COMPUTER-READABLE STORAGE MEDIUMS

(71) Applicant: Nokia Solutions and Networks Oy, Espoo (FI)

(72) Inventors: Kristian Poscic, Rollingwood, TX (US); Sanjay Wadhwa, Cupertino, CA (US); Killian De Smedt, Lochristi (BE); Kenneth Wan, Unionville (CA); Jun Hu, San Jose, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 195 days.

(21) Appl. No.: 17/529,785

(22) Filed: Nov. 18, 2021

(65) Prior Publication Data

US 2023/0156091 A1   May 18, 2023

(51) Int. Cl.
*H04L 67/141* (2022.01)
*H04L 12/66* (2006.01)
*H04L 61/50* (2022.01)
*H04L 101/622* (2022.01)

(52) U.S. Cl.
CPC ............ *H04L 67/141* (2013.01); *H04L 61/50* (2022.05); *H04L 12/66* (2013.01); *H04L 2101/622* (2022.05)

(58) Field of Classification Search
CPC ....... H04L 67/141; H04L 61/50; H04L 12/66; H04L 2101/622; H04L 12/189; H04W 76/12; H04W 76/19; H04W 88/14; H04W 92/24; H04W 4/06; H04W 76/40
See application file for complete search history.

(56) References Cited

U.S. PATENT DOCUMENTS

| | | | | |
|---|---|---|---|---|
| 9,019,814 | B1* | 4/2015 | Mohanty | H04L 45/00 370/219 |
| 10,735,995 | B1* | 8/2020 | Pocha | H04W 28/0263 |
| 2015/0381472 | A1* | 12/2015 | Chippa | H04L 45/02 709/220 |
| 2018/0206275 | A1* | 7/2018 | Jain | H04L 12/56 |
| 2020/0186490 | A1 | 6/2020 | Bhaskaran et al. | |

(Continued)

OTHER PUBLICATIONS

"3rd Generation Partnership Project; Technical Specification Group Core Network and Terminals; Interface between the Control Plane and the User Plane Nodes; Stage 3," 3GPP TS 29.244, Sep. 2021.

(Continued)

*Primary Examiner* — Charles C Jiang
*Assistant Examiner* — Shawn D Miller
(74) *Attorney, Agent, or Firm* — HARNESS, DICKEY & PIERCE, P.L.C.

(57) ABSTRACT

A network element includes at least one processor and at least one memory including computer program code. The at least one memory and the computer program code are configured to, with the at least one processor, cause the network element to: designate a first user plane function, from among the plurality of user plane functions, as a designated broadcast forwarder from which to receive broadcast control traffic, and receive the broadcast control traffic forwarded from the first user plane function, from among the plurality of user plane functions.

11 Claims, 4 Drawing Sheets

(56) References Cited

U.S. PATENT DOCUMENTS

| | | |
|---|---|---|
| 2021/0168569 A1 | 6/2021 | Ayaz et al. |
| 2021/0274321 A1 | 9/2021 | Deng et al. |
| 2021/0409288 A1* | 12/2021 | Hua .................... H04L 12/6418 |

OTHER PUBLICATIONS

Broadband Forum Technical Report, "TR-459/Control and User Plane Separation for a disaggregated BNG," Jun. 2020.

Extended European Search Report dated Mar. 9, 2023.

* cited by examiner

CUPS BNG BASED PACKET FORWARDING SYSTEMS, METHODS AND NON-TRANSITORY COMPUTER-READABLE STORAGE MEDIUMS

TECHNICAL FIELD

One or more example embodiments relate to distributed packet forwarding systems, methods and/or non-transitory computer-readable storage mediums.

BACKGROUND

A Broadband Network Gateway (BNG) is the access point through which network subscribers connect to a broadband network. Control and User Plane Separation in Broadband Network Gateway (CUPS BNG) is an example of a disaggregated BNG. CUPS BNG is defined in Broadband Forum (BBF) Technical Report TR-459 and is also known as disaggregated BNG.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

Conventionally, a subscriber session is established on a user plane function (UPF) on which a broadcasted request arrives. According to one or more example embodiments, however, a control plane function (CPF) may anchor a subscriber session on any UPF, independent of the UPF through which the broadcast session request arrived.

One or more example embodiments provide mechanisms for controlling broadcast control traffic arriving from, for example, a Virtual Private Local Area Network (LAN) Service (VPLS) interconnected to multiple UPFs towards a centralized CPF in a Control and User Plane Separation Border Network Gateway (CUPS BNG). To this end, one or more example embodiments provide broadcast containment where a CPF may select a UPF as a designated broadcast forwarder (DBF) for sending the broadcast control traffic towards the CPF.

One or more example embodiments relate to moving sessions between UPFs (packet forwarding systems) in a highly scalable environment, without having to rely on external load balancers or additional logic that would require control plane integration with external entities (e.g., entities outside the distributed packet forwarding system). One or more example embodiments may rely on standard-based protocols between the nodes in the network. These standard protocols may be utilized in a smart way by the distributed packet forwarding system.

One or more example embodiments are described with regard to CUPS BNG, and the standard based protocols Ethernet Virtual Private Network (EVPN) VPLS at the access side of the network where subscribers are located, and Interior Routing Protocol (IGP)/Exterior Routing Protocol (EGP) Internet Protocol (IP) routing protocols at the 'Internet' side. CUPS BNG interacts with both in an intelligent way, while preserving standard compliance of those protocols while interacting with external nodes.

One or more example embodiments do not require complex logic to interact with network elements in the access network to coordinate movements of subscriber sessions between UPFs. Instead, standard protocols are relied upon.

At least one example embodiment provides a network element having a control plane function configured to communicate with a plurality of user plane functions. The network element includes at least one processor and at least one memory including computer program code. The at least one memory and the computer program code are configured to, with the at least one processor, cause the network element to: designate a first user plane function, from among the plurality of user plane functions, as a designated broadcast forwarder from which to receive broadcast control traffic, and receive the broadcast control traffic forwarded from (e.g., only) the first user plane function, from among the plurality of user plane functions.

At least one example embodiment provides a network element having a control plane function configured to communicate with a plurality of user plane functions. The network element includes: means for designating a first user plane function, from among the plurality of user plane functions, as a designated broadcast forwarder from which to receive broadcast control traffic, and means for receiving the broadcast control traffic forwarded from (e.g., only) the first user plane function, from among the plurality of user plane functions.

At least one example embodiment provides a method of operating a network element having a control plane function configured to communicate with a plurality of user plane functions, the method comprising: designating a first user plane function, from among the plurality of user plane functions, as a designated broadcast forwarder from which to receive broadcast control traffic; and receiving the broadcast control traffic forwarded from (e.g., only) the first user plane function, from among the plurality of user plane functions.

At least one example embodiment provides a non-transitory computer readable medium storing computer readable instructions that, when executed at a network element having a control plane function configured to communicate with a plurality of user plane functions, cause the network element to perform a method comprising: designating a first user plane function, from among the plurality of user plane functions, as a designated broadcast forwarder from which to receive broadcast control traffic; and receiving the broadcast control traffic forwarded from (e.g., only) the first user plane function, from among the plurality of user plane functions.

According to one or more example embodiments, the broadcast control traffic may include at least one of a broadcast session request or a broadcast session initiation packet.

The broadcast control traffic may be received at each of the plurality of user plane functions.

The plurality of user plane functions may be implemented at a plurality of server line cards at one or more network nodes.

The at least one memory and the computer program code may be configured to, with the at least one processor, cause the network element to designate the first user plane function by enabling, at the first user plane function, a control protocol redirection interface between the first user plane function and the control plane function.

The at least one memory and the computer program code may be configured to, with the at least one processor, cause the network element to disable the control protocol redirection interface at each of the plurality of user plane functions other than the first user plane function.

The at least one memory and the computer program code may be configured to, with the at least one processor, cause the network element to: detect a failure at the first user plane function; designate a second user plane function, from among the plurality of user plane functions, as the designated broadcast forwarder in response to detecting the failure at the first user plane function; and receive subsequent broadcast control traffic forwarded from (e.g., only) the second user plane function from among the plurality of user plane functions.

The control plane function may maintain a bidirectional forwarding detection session with each of the plurality of user plane functions.

At least one example embodiment provides a network element having a control plane function configured to communicate with a plurality of user plane functions. The network element includes at least one processor and at least one memory including computer program code. The at least one memory and the computer program code are configured to, with the at least one processor, cause the network element to establish a subscriber session on a first of the plurality of user plane functions in response to a request to establish the subscriber session, the subscriber session being established on the first of the plurality of user plane functions independent of whether the request to establish the subscriber session was received at the control plane function via the first of the plurality of user plane functions.

At least one example embodiment provides a network element comprising: a control plane function configured to communicate with a plurality of user plane functions, the control plane function including means for establishing a subscriber session on a first of the plurality of user plane functions in response to a request to establish the subscriber session, the subscriber session being established on the first of the plurality of user plane functions independent of whether the request to establish the subscriber session was received at the control plane function via the first of the plurality of user plane functions.

At least one example embodiment provides a method of operating a network element having a control plane function configured to communicate with a plurality of user plane functions, the method comprising: establishing a subscriber session on a first of the plurality of user plane functions in response to a request to establish the subscriber session, the subscriber session being established on the first of the plurality of user plane functions independent of whether the request to establish the subscriber session was received at the control plane function via the first of the plurality of user plane functions.

At least one example embodiment provides a non-transitory computer readable medium storing computer readable instructions that, when executed at a network element having a control plane function configured to communicate with a plurality of user plane functions, causes the network element to perform a method comprising: establishing a subscriber session on a first of the plurality of user plane functions in response to a request to establish the subscriber session, the subscriber session being established on the first of the plurality of user plane functions independent of whether the request to establish the subscriber session was received at the control plane function via the first of the plurality of user plane functions.

At least one example embodiment provides a network element having a control plane function configured to communicate with at least a first user plane function and a second user plane function. The network element includes at least one processor and at least one memory including computer program code. The at least one memory and the computer program code are configured to, with the at least one processor, cause the network element to: establish, at the first user plane function, a first fate sharing group including a plurality first subscriber sessions, the first fate sharing group being associated with a first mac address and a first subscriber IP subnet; establish the first fate sharing group at the second user plane function; and activate the first fate sharing group at (e.g., only) the first user plane function from among the first user plane function and the second user plane function.

At least one example embodiment provides a network element having a control plane function configured to communicate with at least a first user plane function and a second user plane function, the network element comprising: means for establishing, at the first user plane function, a first fate sharing group including a plurality first subscriber sessions, the first fate sharing group being associated with a first mac address and a first subscriber IP subnet; means for establishing the first fate sharing group at the second user plane function; and means for activating the first fate sharing group at (e.g., only) the first user plane function from among the first user plane function and the second user plane function.

At least one example embodiment provides a method for operating a network element having a control plane function configured to communicate with at least a first user plane function and a second user plane function, the method comprising: establishing, at the first user plane function, a first fate sharing group including a plurality first subscriber sessions, the first fate sharing group being associated with a first mac address and a first subscriber IP subnet; establishing the first fate sharing group at the second user plane function; and activating the first fate sharing group at (e.g., only) the first user plane function from among the first user plane function and the second user plane function.

At least one other example embodiment provides a non-transitory computer readable medium storing computer readable instructions that, when executed at a network element having a control plane function configured to communicate with at least a first user plane function and a second user plane function, causes the network element to perform a method comprising: establishing, at the first user plane function, a first fate sharing group including a plurality first subscriber sessions, the first fate sharing group being associated with a first mac address and a first subscriber IP subnet; establishing the first fate sharing group at the second user plane function; and activating the first fate sharing group at (e.g., only) the first user plane function from among the first user plane function and the second user plane function.

At least one example embodiment provides a network element having a user plane function between a first network and a second network. The network element includes at least one processor and at least one memory including computer program code. The at least one memory and the computer program code are configured to, with the at least one processor, cause the network element to: configure a first fate sharing group including a plurality of first subscriber sessions, the first fate sharing group associated with a first MAC address and a first subscriber IP subnet; configure a second fate sharing group including a plurality of second subscriber sessions, the second fate sharing group associated with a second MAC address and a second subscriber IP subnet, and the second fate sharing group being configured and active on another user plane function; activate the first fate sharing group at the user plane function; and deactivate the second fate sharing group at the user plane function.

At least one example embodiment provides a network element having a user plane function between a first network and a second network, the network element comprising: means for configuring a first fate sharing group including a plurality of first subscriber sessions, the first fate sharing group associated with a first MAC address and a first subscriber IP subnet; means for configuring a second fate sharing group including a plurality of second subscriber sessions, the second fate sharing group associated with a second MAC address and a second subscriber IP subnet, and the second fate sharing group being configured and active on another user plane function; means for activating the first fate sharing group at the user plane function; and means for deactivating the second fate sharing group at the user plane function.

At least one example embodiment provides a method of operating a network element having a user plane function between a first network and a second network, the method comprising: configuring a first fate sharing group including a plurality of first subscriber sessions, the first fate sharing group associated with a first MAC address and a first subscriber IP subnet; configuring a second fate sharing group including a plurality of second subscriber sessions, the second fate sharing group associated with a second MAC address and a second subscriber IP subnet, and the second fate sharing group being configured and active on another user plane function; activating the first fate sharing group at the user plane function; and deactivating the second fate sharing group at the user plane function.

At least one other example embodiment provides a non-transitory computer readable medium storing computer readable instructions that, when executed at a network element having a user plane function between a first network and a second network, causes the network element to perform a method comprising: configuring a first fate sharing group including a plurality of first subscriber sessions, the first fate sharing group associated with a first MAC address and a first subscriber IP subnet; configuring a second fate sharing group including a plurality of second subscriber sessions, the second fate sharing group associated with a second MAC address and a second subscriber IP subnet, and the second fate sharing group being configured and active on another user plane function; activating the first fate sharing group at the user plane function; and deactivating the second fate sharing group at the user plane function.

According to one or more example embodiments, the first network may be an access network, and the at least one memory and the computer program code may be configured to, with the at least one processor, cause the network element to activate the first fate sharing group by: maintaining forwarding states for the plurality of first subscriber sessions; advertising the first MAC address into the access network; and advertising the first subscriber IP subnet into the second network.

The at least one memory and the computer program code may be configured to, with the at least one processor, cause the network element to deactivate the second fate sharing group by maintaining forwarding states for the plurality of second subscriber sessions.

The at least one memory and the computer program code may be configured to, with the at least one processor, cause the network element to: advertise the second MAC address into the access network, the second MAC address being advertised with a lower metric relative to the advertising of the first MAC address into the access network; and advertise the second subscriber IP subnet into the second network, the second subscriber IP subnet being advertised with a lower metric relative to the advertising of the first subscriber IP subnet into the second network.

The at least one memory and the computer program code may be configured to, with the at least one processor, cause the network element to activate the second fate sharing group on the user plane function.

The at least one memory and the computer program code may be configured to, with the at least one processor, cause the network element to activate the second fate sharing group by: advertising the second MAC address into the access network and advertising the second subscriber IP subnet into the second network.

The at least one memory and the computer program code may be configured to, with the at least one processor, cause the network element to deactivate the second fate sharing group by: maintaining forwarding states for the plurality of second subscriber sessions without advertising the second MAC address into the access network or advertising the second subscriber IP subnet into the second network.

At least one other example embodiment provides a network element having a user plane function of a control and user plane separation in broadband network gateway between a first network entity and a second network entity. The network element includes at least one processor and at least one memory including computer program code. The at least one memory and the computer program code are configured to, with the at least one processor, cause the network element to: determine whether a MAC address received from the first network entity is present at the second network entity, the first network entity being one of a subscriber management module or a border gateway protocol entity, and the second network entity being another of the subscriber management module or the border gateway protocol entity, and update a forwarding database for the user plane function in response to determining that the MAC address is present at the second network entity.

According to one or more example embodiments, the at least one memory and the computer program code may be configured to, with the at least one processor, cause the network element to query the second network entity to determine whether the MAC address is present at the second network entity.

The at least one memory and the computer program code may be configured to, with the at least one processor, cause the network element to update the forwarding database by adding the MAC address.

The forwarding database may be configured to store MAC addresses corresponding only to subscriber sessions established at the user plane function.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
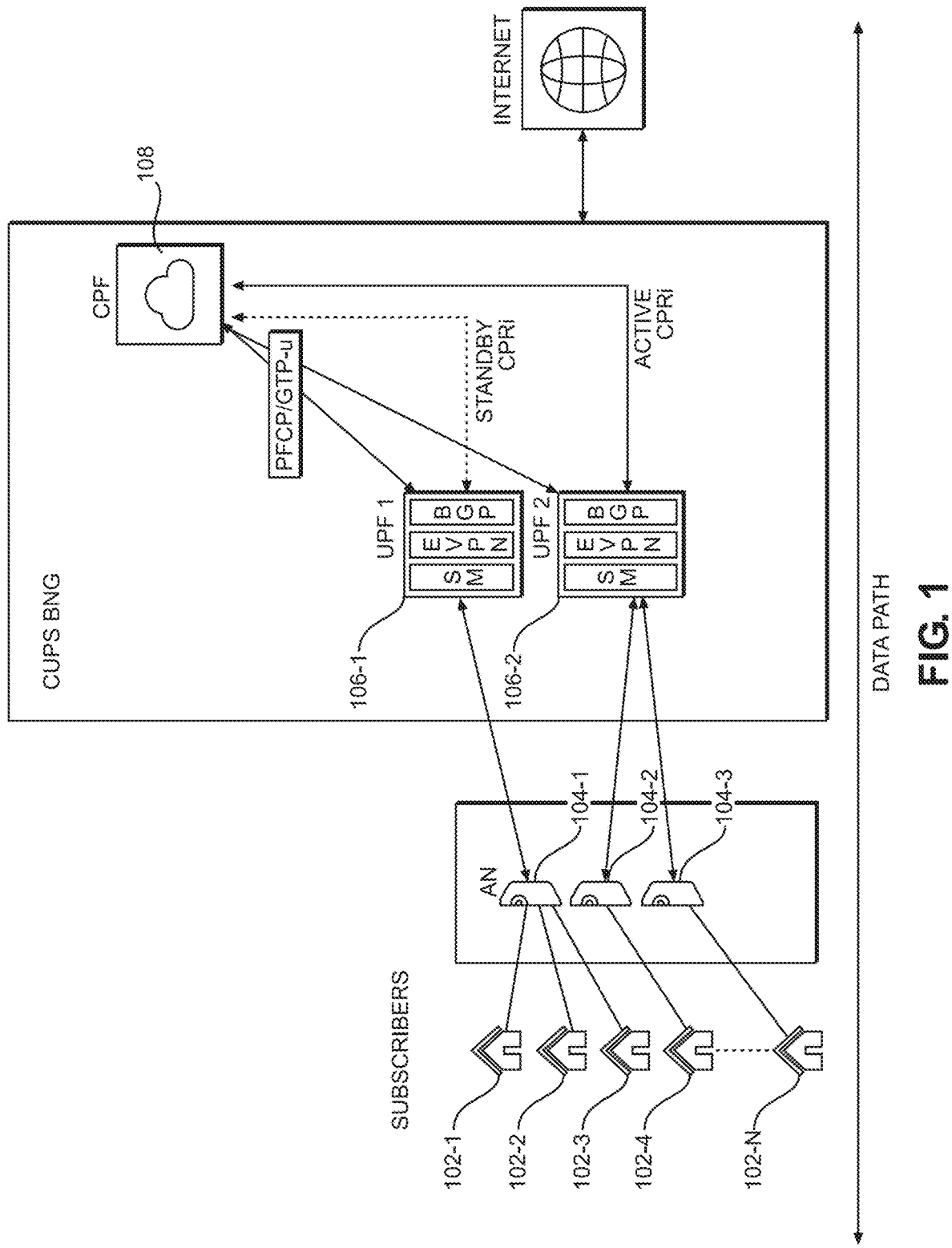
FIG. 1 illustrates a Control and User Plane Separation Border Network Gateway (CUPS BNG) system implementing a method for controlling broadcast requests according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network node or Broadband Network Gateway (BNG), line card, server, etc., it should be understood that one or more example embodiments discussed herein may be performed by one or more processors (or processing circuitry) at the applicable device, apparatus or system. For example, according to one or more example embodiments, at least one memory may include or store computer program code, and the at least one memory and the computer program code may be configured to, with at least one processor, cause the network element to perform the operations discussed herein.

As discussed herein, the term "mechanism," in addition to its plain and ordinary meaning, may refer to methods, apparatuses and/or non-transitory computer readable storage mediums where applicable.

As discussed herein, the terminology "one or more" and "at least one" may be used interchangeably.

It will be appreciated that a number of example embodiments may be used in combination.

A generic packet forwarding system can be roughly abstracted into three components: a user plane (or user plane function (UPF)), a control plane (or control plane function (CPF)) and a management plane (or management plane function (MPF)).

The CPF is responsible for maintaining subscriber session states and providing information to the UPF.

The UPF is responsible for moving packets through the system from ingress to egress, and independently interacting with other nodes in the network through various routing protocols (e.g., Ethernet Virtual Private Network (EVPN), Border Gateway Protocol (BGP), Interior Gateway Protocol (IGP), etc.). For example, the UPF is responsible for setting up forwarding structures necessary to forward subscriber traffic based on information from the CPF.

The MPF is concerned with providing external access to the system and providing information about the operational state of the system.

In an integrated packet forwarding system, at least the UPF and the CPF are integrated in the same physical system, which is represented as a single node, in a network (with self-contained hardware and software). Such packet forwarding systems may manage their resources with self-contained logic. For example, if the system is maintaining a session state for which it also forwards packets, then the sessions may be distributed across the line cards using the logic within the system without external assistance (e.g., via load balancers). The logic behind the resources utilization resides and is executed at the CPF within the system itself.

In a distributed packet forwarding system, the CPF for session management is extracted from the packet forwarding node itself and placed in a centralized and remote (e.g., cloud) location where the CPF maintains states for multiple UPFs, each of which may be a separate physical system (e.g., separate line card and/or network node) pushing packets through the network.

As mentioned briefly above, Control and User Plane Separation in Broadband Network Gateway (CUPS BNG) is an example of a disaggregated BNG within a distributed packet forwarding system. The CUPS BNG may be positioned between the access network side and the Internet of the network. On the access network side, subscribers (e.g., via Customer Premises Equipment (CPE)) may communicate with the CUPS BNG via access nodes.

In CUPS BNG, the subscriber-related control plane function is extracted to a centralized CPF. However, as mentioned similarly above, other, non-subscriber management control functions (e.g., routing protocols, EVPN services, etc.) remain at the UPFs. The management plane function also remains at the UPFs. In CUPS BNG, a session management interface between the CPF and UPF is based on the Packet Forwarding Control Protocol (PFCP) defined in 3GPP document 29.244.

The BNG, or CUPS BNG in the distributed packet forwarding system, serves as the intelligence in the network that controls the access to the subscriber. Accordingly, the BNG must be aware of each subscriber being served. For this reason, each subscriber is setup in the BNG (e.g., in the UPF) as a stateful session (referred to herein as a subscriber session), usually based on the Dynamic Host Configuration Protocol (DHCP) or Point-to-Point Protocol over Ethernet (PPPoE). This session awareness ensures that the BNG provides various CPFs for the subscriber (e.g., authentication, accounting, policy identification, etc.) as well as data plane functions (DPFs) such as security (e.g., antispoofing, etc.), Quality of Service (QoS), and/or various forwarding statistics. Once a subscriber session is established between the BNG and a subscriber on the CPF level, the subscriber may communicate with the outside world (e.g., the Internet) via a data path through a UPF.

To avoid any proprietary interfaces between the access nodes in the access network connected to the CUPS BNG, a standard based technology, such as EVPN Virtual Private Local Area Network (LAN) Service (VPLS) (or EVPN multipoint or ELAN), may be deployed in the access network. The CUPS BNG (e.g., via the UPFs) may be connected directly to the EVPN VPLS-based access network.

On the access network side, each UPF advertises proper routes (MAC addresses) into the access network such that the traffic from subscribers (e.g., via CPE) is routed to the UPF on which the corresponding subscriber session is established.

On the 'Internet' side, the IP address of the subscriber session is advertised only from the UPF on which the subscriber session is hosted such that return traffic towards the subscriber session in the downstream direction (to the subscriber from the Internet) flows through the same UPF as the upstream traffic toward the UPF from the subscriber. Such symmetric traffic flow may, for example, help ensure QoS guarantees of the traffic on the UPF, to simplify accounting, troubleshooting, management functions and/or provide the basis for potential value-added services.

With EVPN VPLS in the access network, the subscriber may be virtually connected to any UPF in the VPLS, without 're-wiring' the access network. This may be achieved through various tunneling transport technologies that are supported in EVPN and defined by the IETF. Traffic from subscribers is attracted (or sent) to the proper UPF through the UPF advertising local routes towards the access nodes. Those routes are based on MAC addresses in the VPLS environment.

The advertised MAC address from a UPF towards the access nodes represents the MAC address of the default IP gateway for Internet Protocol over Ethernet (IPoE) subscribers or the Point-to-Point Protocol (PPP) Termination and Aggregation (PTA) end point for PPPoE subscribers. Usually, subscribers sharing a default IP gateway or a PTA endpoint belong to the same IP subnet. In this way, the IP addresses assigned to these subscribers are from the same IP subnet.

A UPF may support multiple default IP gateways (also referred to as IP default gateways) or PPPoE endpoints, each with a unique MAC address, or a shared MAC address (i.e., multiple subnets each with its own default IP gateway may share a MAC address). Accordingly, subscribers associated with a given UPF may be grouped into smaller units each with a unique MAC address that may then be moved between UPFs for various purposes, such as subscriber session load balancing across UPFs or service groupings with differentiated forwarding characteristics (e.g., latency, delivery guarantees, etc.).

The CPF allocates or assigns subscriber sessions among UPFs during session instantiation time. To assign a subscriber session, the CPF uses logic to select a UPF from among the plurality of UPFs. The logic may be based on session load, required traffic characteristics such as latency, bandwidth, etc. Once the subscriber session is pinned down to a given UPF, the CPF may move the subscriber session to another UPF during the lifetime of the subscriber session for the same or substantially the same reasons as when the subscriber session is first established (e.g., load rebalancing). As the subscriber sessions may be located amongst the UPFs relatively arbitrarily, coordination with access nodes in the access network may be needed to ensure the traffic originated by the subscriber is attracted to the UPF on which the corresponding subscriber session is established.

The access nodes need not be directly aware of this mapping so as to avoid any proprietary coordination. Rather, the access nodes relay on the MAC address advertisement, which is based on standard protocols (e.g., EVPN), and are not aware of where the subscriber is allocated. To this end, according to one or more example embodiments, access nodes may forward traffic based on destination MAC addresses, which is the MAC address of the default IP gateway.

One or more example embodiments also provide methods, apparatus and/or non-transitory computer readable storage mediums for controlling the UPF location for a subscriber session based on, for example, session load balancing across UPFs or selecting the UPFs with certain traffic forwarding characteristics (e.g., latency, bandwidth, etc.).

Conventionally, broadcast messages in the VPLS environment are propagated to all attachment points that are not in the same split-horizon group. In the context of CUPS BNG, broadcast messages that are destined and processed on the CPF arrive from each UPF that receives the broadcast message. Examples of such broadcast messages include broadcast session requests or session initiation packets (DHCPv4 DORA, PPPoE PADx, DHCPv6 Solicitation/Advertise/Request/Reply, etc.).

According to one or more example embodiments, the CPF designates a UPF, from among a plurality of UPFs, as the Designated Broadcast Forwarder (DBF) (or DBF UPF) by enabling the Control Plane Redirection interface (CPRi) at only one DBF UPF. All other UPFs maintain a configured CPRi with the CPF, but its state remains disabled until the UPF is promoted to the DBF by the CPF. This is discussed further below with regard to FIGS. 1 and 5.

According to one or more example embodiments, the CPF may establish a subscriber session on any UPF in the EVPN VPLS, regardless (or independent) of the UPF on which the session setup request, such as the broadcast session request (e.g., DHCP Discover, PPPoE PADI, etc.), arrives. The CPF may select a UPF on which to establish (or move) a subscriber session using any suitable algorithm based on given criteria. For example, the CPF may select the least utilized UPF during the subscriber session establishment phase to improve (e.g., optimize) subscriber session distribution over UPFs. This will be discussed in more detail later with regard to FIG. 1.

In CUPS BNG, the CPF may group subscriber sessions together in order to aggregate IP routes on the 'Internet' side. On the access network side, the subscriber management module on the UPF informs the EVPN VPLS of the MAC address that is required in EVPN VPLS to reach this group of subscriber sessions. The MAC address is then advertised by EVPN VPLS towards the access network so that the access network learns the path to the correct UPF for the subscriber sessions. When subscriber sessions are moved between UPFs (e.g., in a controlled way) by the CPF, the subscriber management module re-announces the MAC address into the EVPN VPLS to establish a new path to the new UPF.

One or more example embodiments provide mechanisms for advertising a destination MAC address for a group of subscriber sessions from one UPF such that the traffic for the session is attracted to the UPF on which the group of subscriber sessions is established. In case the group of subscriber sessions is relocated to another UPF, the same MAC address may be re-advertised from the new UPF.

In more detail, for example, the CPF may group the subscriber sessions on each UPF together into Fate Sharing Groups (FSGs). In a FSG, all subscriber sessions share a common default gateway IP/MAC address for a group of IPoE subscribers, a common aggregation endpoint and a MAC address for a group of PPPoE subscribers and one or more common IP subnets under which the subscribers are grouped. As a result, the IP addresses assigned to subscribers under the same FSG belong to the same subnet(s). On the network side, this helps achieves improved route aggregation per FSG on the network side. As discussed herein, the subscriber IP subnet(s) (or set of IP subnets) and the default IP gateway(s) (or set of default IP gateways) for IPoE subscribers or PTA end point for PPPoE subscribers and associated MAC address(es) (referred to as FSG MAC(s)) may be referred to as a FSG duo.

Because the FSG is tied to one or more subscriber IP subnets, the subscriber IP subnet(s) is/are advertised through a routing protocol into the network side. In this way, downstream traffic is attracted to the UPF hosting the active FSG for a group of subscribers. For more granular control of subscribers, the FSG may be associated with a single subnet potentially accommodating a smaller number of sessions.

According to one or more example embodiments, a FSG with the same FSG duo may be configured, but not necessarily activated, on multiple UPFs. However, only one UPF serves the subscribers sharing a FSG duo. Thus, the FSG with the same FSG duo may be activated on only one UPF from among the UPFs between the CPF and the subscribers. This helps ensure symmetric traffic flow for the subscriber (upstream and downstream through the same UPF), which is important (e.g., critical) for consistent and simplified accounting and QoS. As discussed herein, an active FSG refers to an FSG at a UPF actively serving the subscribers of the FSG, whereas a standby (or inactive) FSG refers to an FSG that is configured at, but not actively served by, the UPF.

According to one or more example embodiments, for an active FSG with a given FSG duo at a UPF, the UPF (i) maintains forwarding states for the subscriber sessions in the FSG at the UPF; (ii) advertises the FSG MAC address into the access network towards the access node (to attract subscriber traffic to the proper UPF for the FSG where the subscriber sessions are terminated); and (iii) advertises the subscribers IP subnet into the Internet side of the network (to attract traffic from the Internet towards the subscriber at the correct UPF). The UPF advertises the FSG MAC address towards the access nodes via EVPN BGP. The FSG MAC address advertisement via EVPN BGP is triggered at the UPF by subscriber management (e.g., Gratuitous Address Resolution Protocol (GARP) or static MAC population by subscriber management directly into the VPLS MAC table). In the GARP example, the subscriber management may dynamically notify EVPN about the MAC address that needs to be advertised via GARP. In this example, the subscriber management sends a GARP message, which is picked up by EVPN, and the EVPN advertises the MAC address within the GARP via BGP. In this example, only on the active (not the standby) UPF/FSG may advertise the route.

In the static MAC population, the subscriber management programs the MAC routes statically into EVPN. In this case the active and standby UPFs may advertise the MAC and subscriber routes, although the standby UPF may advertise the routes with a higher cost (e.g., lower preference). In this example, the routes have UPF/FSG awareness, which is provided by subscriber management.

It is possible that two UPFs may advertise the same routes into the network at the same time, although with different associated costs. In this case, the UPF with the active FSG may advertise the routes with the lower cost (e.g., higher preference) than the UPF with the counterpart FSG in the inactive (standby) state. This assumes that the routing process in the UPF is aware of the FSG activity in order to adjust the cost of the routes associated with the FSG. An approach where two UPFs advertise the same routes with different metrics may mitigate (e.g., minimize) traffic outage and/or improve routing stability during transient condition when sessions are moved between UPFs.

A UPF with a standby FSG may maintain the forwarding states for the subscriber session, but may not advertise the FSG MAC address into the access network and the subscribers IP subnet into the Internet side of the network, or they may advertise the FSG MAC address, but with higher cost (lower preference) than the active UPF.

Through the use of active and standby FSGs across UPFs, subscriber sessions (and FSGs) may be moved between UPFs to, for example, rebalance traffic. The smaller size of the subscriber IP subnet attached to the FSG may allow for higher granularity of traffic rebalancing.

According to one or more example embodiments, multiple FSGs may be active on a given UPF as long as the FSG MAC address is unique per FSG. The view of the UPFs and FSGs is maintained at, for example, the CPF, and in the load balancing use case, the CPF determines on which UPF an FSG should be activated. The FSG may be used in various resiliency schemes, and in such case, the UPF may provide feedback to the CPF as to where to move the FSG.

Rebalancing of subscriber sessions (e.g., by moving FSGs) may be triggered in a controlled manner (e.g., based on thresholds or operator driven). In this regard, the CPF may deactivate a FSG duo on a more loaded UPF and activate the same FSG duo on a newly selected, less loaded UPF.

Sharing of the FSG MAC address between the FSGs, but activating in only on a single device may be important in steering traffic in VPLS. As such, this solution is independent of the session type (IPoE or PPPoE) or deployment type (subscriber per VLAN, service per VLAN or a flat network). This example embodiment will be discussed further below with regard FIG. 2.

By moving subscriber sessions across UPFs according to one or more example embodiments, an external entity specifically designed for load balancing may be omitted. This may mitigate the need to have additional intelligence in the network combined with load balancing devices or controllers that steer subscriber sessions in the access network to the appropriate UPF through some additional mechanism (e.g., via NETCONF configuration, etc.). Instead, one or more example embodiments rely on native EVPN mechanisms that are utilized by the CUPS in an intelligent way and the controls are entirely contained within the CUPS BNG system.

The ability to control the location of the session, be it initially or after the subscriber session is established, may provide the network operator the opportunity to better utilize network resources or to honor Service Level Agreements (SLAs).

While subscriber sessions are activated only one UPF (e.g., the UPF serving the subscriber sessions), the MAC address of the default IP gateway is shared between the candidate UPFs on which the same subscriber sessions may live (or be established). Accordingly, the serving UPF is "active," whereas the other UPFs are "inactive" or on "standby." While discussed with regard to suppressing of advertisements from a standby UPF completely in some instances, standby UPFs may suppress advertisement of routes in the network completely or advertise the routes with one or more less preferential (lower) metrics. Example metrics include (e.g., higher) cost associated with a given path.

If the routes on the standby UPF are advertised with a lower metric, then the routing protocol advertising those routes should be aware of the FSG state (active/standby). This awareness may be built into the routes by subscriber management by associating a route with a 'route-tag' that represents the state of the FSG. The routing-policy may then assign the metric/cost to the route according to the route-tag.

On the 'Internet' side, the advertisement of IP routes in the IP network is tied to the UPF where the subscriber sessions are established, which requires interaction between the IP routing (e.g., Border Gateway Protocol (BGP) routing service, sometimes referred to herein as BGP) and subscriber management (SM) module. One or more example embodiments provide mechanisms for communication between the subscriber management module and IP routing where only the IP routes for the locally established sessions are advertised.

One or more example embodiments also provide mechanisms for controlling insertion of MAC addresses into forwarding structures in a more optimal way that may allow higher subscriber scaling in CUPS BNG.

Localized learning of a MAC address for a subscriber session at a UPF may be required for a scaled CUPS BNG system. In an EVPN VPLS environment, MAC addresses of all nodes participating in communication within the VPLS are learned through BGP. And each UPF maintains the MAC addresses of all subscribers in its BGP database. However, installing all of these MAC addresses in the local data plane (e.g., in the forwarding database (FDB)) may increase (e.g., significantly increase) the likelihood of resource exhaustion in the local data plane since CUPS BNG can potentially support tens of millions of subscribers and MAC addresses. This is true across vendors. To reduce the likelihood of this resource exhaustion, one or more example embodiments provide mechanisms for installing, in the local data plane, only the MAC addresses for the subscriber sessions that are locally instantiated on the UPF. MAC addresses of the subscriber sessions that are anchored in other UPFs are not installed locally in the data plane. This local subscriber awareness in EVPN VPLS is provided by direct interaction between the subscriber management module (also referred to as subscriber management or subscriber management component or entity), the EVPN component and BGP within the UPF. Moreover, mechanisms according to example embodiments are self-contained within CUPS BGP and not dependent on the access node coloring the routes during advertisement so that only colored routes are imported via a routing policy into the data plane on a UPF. This is discussed more later with regard to FIGS. 3A and 3B.

FIG. 1 illustrates a CUPS BNG system implementing a method for controlling broadcast requests according to example embodiments. In addition to the discussion set forth below, it should be understood that the components and/or elements shown in FIG. 1 (e.g., subscribers, access nodes, UPFs, CPFs, etc.), may include and/or implement the functionality discussed above. Accordingly, for the sake of brevity, certain details discussed above will not be repeated below.

Referring to FIG. 1, the CUPS BNG includes a plurality of UPFs 106-1 and 106-2 in communication with a plurality of access nodes (ANs) 104-1, 104-2 and 104-3, which serve a plurality of subscribers 102-1, 102-2, 102-3, 102-4, . . . 102-N. Each UPF 106-1 and 106-2 may be implemented as one or more line cards at a network node, Broadband Network Gateway (BNG), or the like. Among other things, each of the UPFs 106-1 and 106-2 may include a subscriber module (SM), a BGP module (e.g., including a BGP database) and an EVPN module. Although only two UPFs and 3 access nodes are shown in FIG. 1 for simplicity, example embodiments should not be limited to this example. Rather, any number of UPFs and access nodes may be included in a CUPS BNG system.

The UPFs 106-1 and 106-2 are in two-way communication with a CPF 108 via a session management control interface (e.g., based on Packet Forwarding Control Protocol (PFCP)) and a Control Plane Redirection interface (CPRi) based on the General Packet Radio Services (GPRS) Tunneling Protocol (GTP-u). As discussed herein, the portion of the network including subscribers and access nodes may be referred to as the "access side" or "access network side," whereas the side of the network including the Internet may be referred to as the "Internet side."

The CPF 108 is a centralized CPF located at, for example, a cloud network node or other remote location, which is a separate physical entity from the location of the UPFs 106-1 and 106-2.

According to at least this example embodiment, the CPF 108 selects a UPF, from among the UPFs 106-1 and 106-2, as the DBF UPF by enabling, for example, the default CPRi between the UPF and the CPF 108 and disabling the default CPRi between the other UPF and the CPF 108. In one example, the CPF 108 may select the UPF 106-2 as the DBF UPF, enable the default CPRi between the UPF 106-2 and the CPF 108 (active CPRi), and disable the default CPRi between the UPF 106-1 and the CPF 108 (standby CPRi).

By designating the UPF 106-2 as the DBF UPF, as data traffic to and from subscribers traverses the UPFs 106-2 and 106-1 via a data path, subscriber control traffic (e.g., such as subscriber session control packets, broadcast session initiation packets, or the like) is diverted and forwarded from only the UPF 106-2 to the CPF 108. By designating the UPF 106-2 as the DBF UPF, broadcast traffic sent towards the CPF 108 may be restricted to a single copy.

While the state of the default CPRi at the UPF 106-1 is disabled, the UPF 106-1 maintains a configured default CPRi with the CPF 108 to enable faster failover in response to detecting a failure of the UPF 106-2. In one example, in response to failure of the UPF 106-2, the CPF 108 may enable the default CPRi at the UPF 106-1, and disable the state of the default CPRi at the UPF 106-2, there by designating the UPF 106-1 as the DBF UPF.

Figure 5:
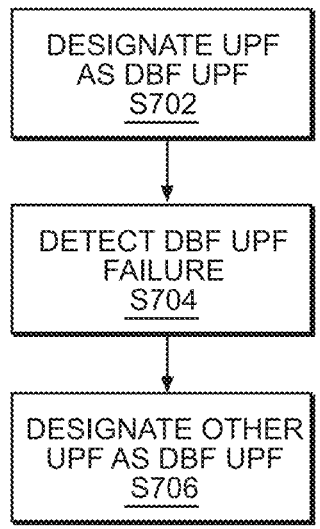
FIG. 5 is a flow chart illustrating another method according to example embodiments.

FIG. 5 is a flow chart illustrating a method controlling broadcast control traffic in a CUPS BNG, according to example embodiments. For example purposes, the method shown in FIG. 5 will be discussed with regard to the above example and FIG. 1. However, it should be understood that example embodiments are not limited to this example.

Referring to FIG. 5, at step S702 the CPF 108 designates the UPF 106-2 as the DBF UPF by activating the default CPRi (active CPRi) between the UPF 106-2 and the CPF 108 (active CPRi). Also, at step S702, the CPF 108 disables the default CPRi at the UPF 106-1 (standby CPRi). Once designated, the subscriber control (or broadcast) traffic flows only from the UPF 106-2, among the UPFs 106-1 AND 106-2, to the CPF 108.

At step S704, the CPF 108 detects a failure at the UPF 106-2. In one example, the connectivity between the access node and the UPF may fail. In another example, the entire UPF may fail (crash). Mechanism for failure detection by the CPF may vary. For example, the CPF may use the bidirectional failure detection (BFD) protocol to detect a connectivity issue between the two remote nodes, such as the CPF and the UPF. In another example, a BFD may run between the UPF and the access node. In this example, when the UPF detects that the network path is broken (access node is inaccessible), the UPF may send a health report to the CPF. The CPF may then decide to switch the session over based on the health reports.

Although discussed herein with regard to a failure at step S702, example embodiments should not be limited to this example. Rather, designation of the DBF may be moved from one UPF to another UPF on-demand by a network operator, for example, in order to rebalance the traffic across the UPFs.

In response to detecting the failure of the UPF 106-2, at step S706 the CPF 108 designates the UPF 106-1 as the DBF UPF by enabling the state of the CPRi between the UPF 106-1 and the CPF 108. Also, at step S706, the CPF 108 may disable the state of the CPRi at the UPF 106-2. Once designated, the subscriber control (or broadcast) traffic begins to flow to the CPF 108 only through the newly designated UPF 106-1 (the DBF UPF).

With the example embodiments shown in FIGS. 1 and 5, while a broadcast session request (or other broadcast control traffic) from a subscriber may arrive on one or more of the plurality of UPFs in communication with a CPF, only one copy of the broadcast session request is forwarded to the CPF by the UPF (designated as the DBF UPF).

Moreover, although only a single UPF is designated as the DBF, each UPF has a bidirectional forwarding detection (BFD) session to the CPF (e.g., via the CPRi) such that in case of a failure of the UPF designated as the DBF, an alternate UPF may be more quickly selected and designated as the DBF UPF.

Figure 2:
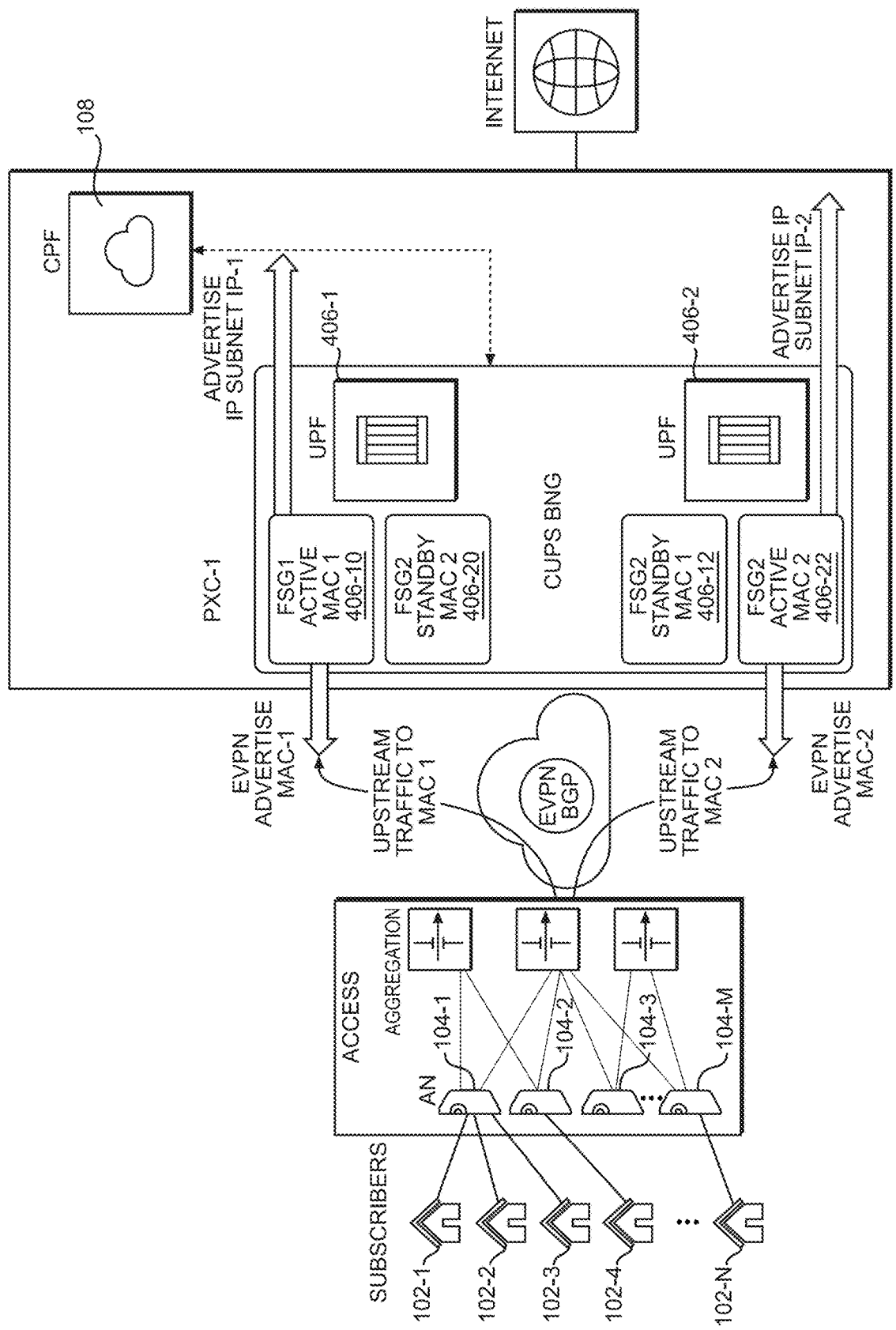
FIG. 2 illustrates a portion of a network including a CUPS BNG implementing methods for traffic steering to subscriber session hosting UPFs, according to example embodiments.

FIG. 2 illustrates a portion of a network including a CUPS BNG implementing methods for traffic steering to subscriber session hosting UPFs, according to example embodiments. As with FIG. 1, in addition to the discussion set forth below, it should be understood that the components and/or elements shown in FIG. 2 (e.g., subscribers, access nodes, UPFs, CPFs, etc.), may include and/or implement the functionality discussed above. Accordingly, for the sake of brevity, certain details discussed above will not be repeated below.

In the example embodiment shown in FIG. 2, the MAC and IP subnet advertisement is tied to FSG activity at a particular UPF.

Referring to FIG. 2, in this example embodiment, an active FSG and a standby (or inactive) FSG are configured at each of the UPFs 406-1 and 406-2. More specifically, for example, active first FSG 406-10 (FSG1) and a standby second FSG 406-20 (FSG2) is configured at the UPF 406-1, and an active second FSG 406-22 (FSG2) and a standby first FSG 406-12 (FSG1) are configured at the UPF 406-2. The active first FSG 406-10 and the standby first FSG 406-12 share the same first FSG duo (e.g., MAC address MAC-1 and IP Subnet IP-1), and the active second FSG 406-22 and the standby second FSG 406-20 share the same second FSG duo (e.g., MAC address MAC-2 and IP Subnet IP-2). The first FSG duo and the second FSG duo are different.

In the example embodiment shown in FIG. 2, the UPF 406-1 maintains forwarding states for subscriber sessions included in the active first FSG 406-10 and the standby second FSG 406-20. Moreover, the UPF 406-1 advertises the MAC address MAC-1 of the first FSG duo into the access network side and the IP Subnet IP-1 of the first FSG duo into the Internet side, but does not advertise the MAC address MAC-2 of the second FSG duo into the access network side or the IP Subnet IP-2 of the second FSG duo into the Internet side.

The UPF 406-2 maintains forwarding states for subscriber sessions included in the active second FSG 406-22 and the standby first FSG 406-12. Moreover, the UPF 406-2 advertises the MAC address MAC-2 of the second FSG duo at the access network side and the IP Subnet IP-2 of the second FSG duo into the Internet side, but does not advertise the MAC address MAC-1 of the first FSG duo into the access network side or the IP Subnet IP-1 of the first FSG duo into the Internet side.

By advertising the MAC address MAC-1 from only the UPF 406-1, from among UPFs 406-1 and 406-2, upstream subscriber traffic from subscribers associated with subscriber sessions in FSG 406-10 may pass through access nodes 104-1-104-M, be aggregated (Agg), and directed to UPF 406-1. Similarly, by advertising the MAC address MAC-2 from only the UPF 406-2, from among UPFs 406-1 and 406-2, upstream subscriber traffic from subscribers associated with subscriber sessions in FSG 406-22 may pass through access nodes 104-1-104-M, be aggregated, and directed to UPF 406-2.

As discussed above, the CPF 108 may activate/deactivate FSG duos (and FSGs) to steer traffic amongst UPFs as needed to achieve, for example, load balancing. By deactivating an FSG duo (or FSG) at a UPF, and activating the same FSG duo (or FSG) at another UPF, the CPF may move a FSG from one UPF to another UPF. For example, with regard to the example shown in FIG. 2, if the CPF 108 determines that the UPF 406-1 is overloaded, then the CPF 108 may deactivate the first FSG duo at the UPF 406-1, and activate the first FSG duo at the UPF 406-2, thereby moving the FSG associated with the first FSG duo from the UPF 406-1 to the UPF 406-2. Once the first FSG duo is activated at the UPF 406-2, the UPF 406-2 begins to advertise the MAC address MAC-1 of the first FSG duo into the access network side and the IP Subnet IP-1 of the first FSG duo into the Internet side. Furthermore, in response to being deactivated, the UPF 406-1 no longer advertises the MAC address MAC-1 of the first FSG duo into the access network side or advertises the IP Subnet IP-1 of the first FSG duo into the Internet side of the network.

Example embodiments are discussed herein with regard to no longer advertising routes or MAC addresses in response to deactivating of a FSG or FSG duo at a UPF. However, example embodiments should not be limited to these examples. Rather, in response to deactivating a FSG or FSG duo at a UPF, the UPF may advertise the FSG duo with less favorable cost(s) (e.g., higher cost/lower preference) than on the UPF with the active FSG or FSG duo. In this regard, the active FSG/FSG duo/UPF may be referred to as the primary FSG/FSG duo/UPF and the inactive (or standby) FSG/FSG duo/UPF may be referred to as the secondary FSG/FSG duo/UPF.

As noted above, one or more example embodiments also provide mechanisms (e.g., methods, apparatuses and/or non-transitory computer readable storage mediums) for controlling insertion of MAC addresses into forwarding structures in a more optimal way that may allow higher subscriber scaling in CUPS BNG.

Figure 3B:
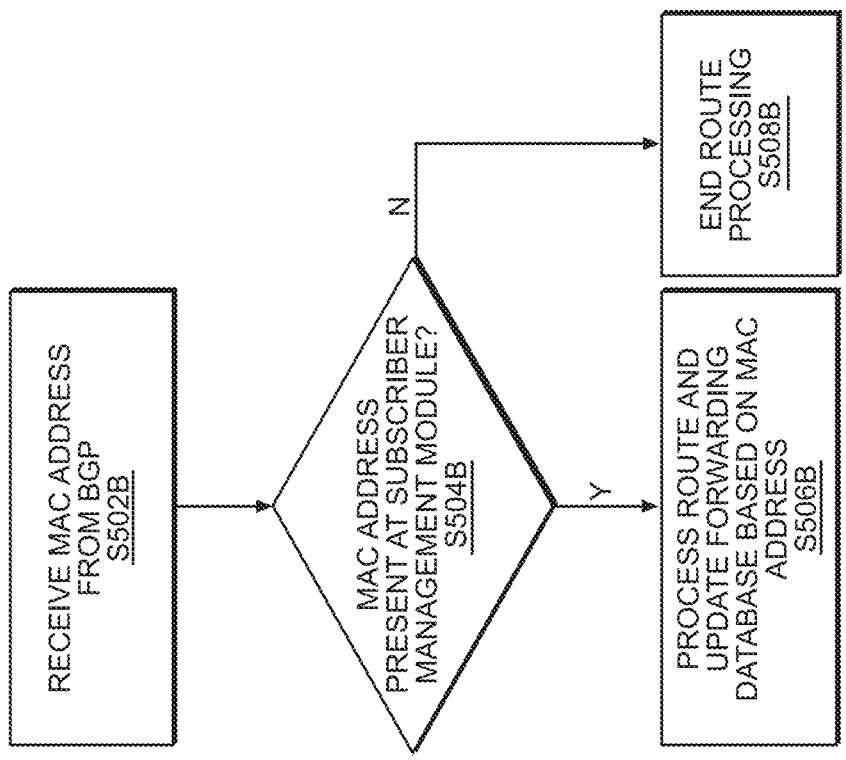
FIG. 3B is a flow chart illustrating another method according to example embodiments.
Figure 3A:
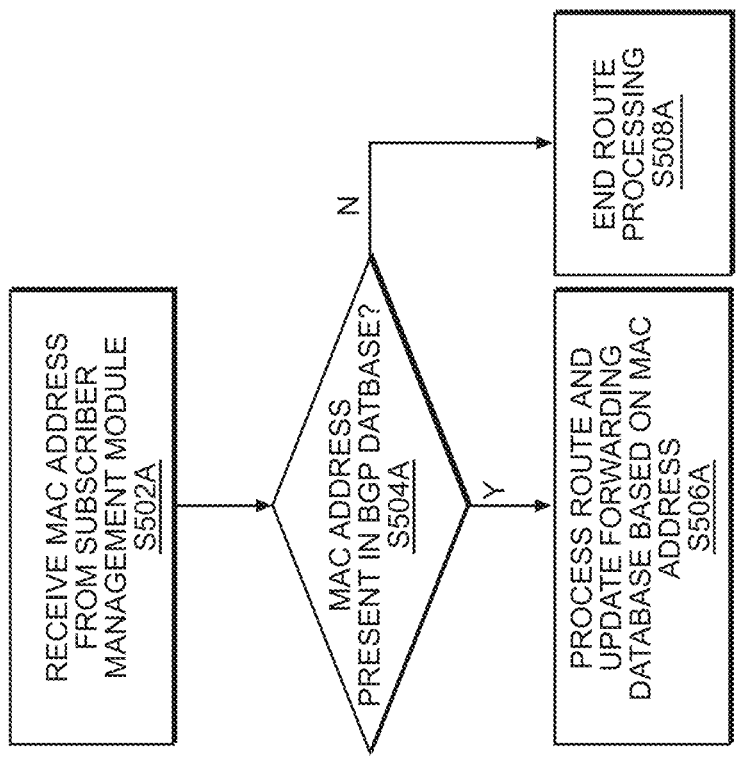
FIG. 3A is a flow chart illustrating a method according to example embodiments.

FIGS. 3A and 3B are flow charts illustrating methods for controlling insertion of MAC addresses into forwarding structures at a UPF, according to example embodiments. In more detail, FIG. 3A is a flow chart illustrating a method of updating the local data plane at the UPF based on MAC addresses from the subscriber management module (or entity or component), and FIG. 3B is a flow chart illustrating a method of updating the local data plane at the UPF based on MAC addresses from the BGP (or BGP database).

For example purposes, the example embodiments shown in FIGS. 3A and 3B will be discussed with regard to the CUPS BNG system shown in FIG. 1, and in particular the UPF 106-1. In this regard, the example embodiments shown in FIGS. 3A and 3B will be discussed as being performed by the EVPN at the UPF 106-1. It should be understood, however, that the example embodiments shown in FIGS. 3A and 3B may be described as being performed by the UPF 106-1.

The example embodiments shown in FIGS. 3A and 3B will be discussed with regard to a single MAC address in some instances. It should be understood, however, that example embodiments should not be limited to these examples. Rather, example embodiments may be applicable to other distributed forwarding systems and/or one or more MAC addresses and/or groups of MAC addresses.

Referring to FIG. 3A, at step S502A, the EVPN at the UPF 106-1 receives a MAC address for a locally established subscriber session from the subscriber management module in the UPF 106-1. In one example, the subscriber management module may submit a call to add the MAC address to the local data plane at the UPF 106-1, for example, in response to a request to add a subscriber session at the UPF.

At step S504A, the EVPN determines whether the MAC address is present at the BGP (or in the BGP database) at the UPF 106-1. In one example, the EVPN queries the BGP database to determine whether the same MAC address is already learned (is present) in the BNG.

If the received MAC address does not exist in the BGP database, then at step S508A route processing is ended and the local data plane (e.g., the forwarding database) is not updated based on the MAC address.

Returning to step S504A, if the received MAC address exists in the BGP database, then at step S506A the local data plane is updated based on the received MAC address. In one example, the forwarding database (e.g., at the EVPN) is updated based on the received MAC address. If the MAC address submitted by the subscriber management module is part of a call to add the MAC address to the forwarding database, then the EVPN adds the MAC address to the forwarding database.

According to the example embodiment shown in FIG. 3A, the EVPN may install the MAC address (or addresses) in the local data plane only if the MAC address (or addresses) received from the subscriber management module is/are also known at the BGP (learned from the remote end, such as a BGP router).

Referring now to FIG. 3B, at step S502B, the EVPN at the UPF 106-1 receives or obtains a MAC address from the BGP at the UPF 106-1. In one example, the BGP may learn the MAC address from a BGP router, and submit the learned MAC address to the EVPN as part of a call to add the MAC address to the local data plane at the UPF 106-1.

At step S504B, the EVPN determines whether the MAC address from the BGP is also known at the subscriber management module (e.g., a subscriber session associated with the MAC address is setup locally) at the UPF 106-1. In one example, the EVPN at the UPF 106-1 queries the subscriber management module (e.g., a database at the subscriber management module) to determine whether the same MAC address is already learned (is present) in the subscriber management module.

If the received MAC address is not known at the subscriber management module, then at step S508B route processing is ended and the forwarding database is not updated based on the received MAC address.

Returning to step S504B, if the received MAC address is known at the subscriber management module, then at step S506B the local data plane is updated based on the received MAC address. In one example, the forwarding database at the EVPN is updated based on the received MAC address. If the MAC address is part of a call from the BGP to add the MAC address to the local data plane, then the EVPN adds the MAC address to the forwarding database.

According to the example embodiment shown in FIG. 3B, the local data plane at the UPF 106-1 is updated based on BGP learned MAC address (or addresses) only if the MAC address (or addresses) is/are also known at subscriber management module.

According to one or more example embodiments, only local MAC addresses are installed in the forwarding database (FDB). All MAC addresses are learned at the BGP, but then installed locally only if the MAC addresses are also present in the subscriber management (learned through the subscriber management via DHCP, PPPoE, etc.). Until the MAC addresses are reconciled (learned by both subscriber management and BGP), traffic sent back to the subscriber is sent to all access nodes (because the MAC address is not installed in the forwarding plane). This is generally during a relatively short interval where the MAC address is learned via BGP, but not subscriber management, or vice versa. The origin of this is at the access node, wherein when the access node receives a first packet from the subscriber, the access node learns the subscriber MAC address and propagates the MAC address via BGP to the UPF, such that the MAC address is known to the BGP in the UPF. Because subscriber management learns via different means (e.g., DHCP, PPPoE, etc.). Subscriber management does learn the subscriber MAC address from the same packet that triggered BGP at the access node, but using a different path. For example, BGP may be faster than subscriber management, or vice versa, and during the relatively short period of time during session initiation time, there may be some discrepancy. When both BGP and SM are aware of the subscriber, the EVPN populates the FDB because this indicates that the subscriber is local to the UPF.

Through example embodiments shown in FIGS. 3A and 3B, higher subscriber scaling per CUPS BNG may be achieved.

The example embodiments shown in FIGS. 3A and 3B are discussed with regard to determining whether to add a MAC address to the local data plane at the UPF. For removal of MAC addresses from the local data plane, the subscriber management module and/or the BGP may directly remove the MAC address, without utilizing the procedure discussed above with regard to FIGS. 3A and/or 3B.

Although example embodiments may be discussed herein with regard to EVPN VPLS, it should be understood that EVPN VPLS may also be referred to as EVPN Multipoint or EVPN ELAN, and these terms may be used interchangeably. Thus, example embodiments should not be limited to only EVPN VPLS.

Figure 4:
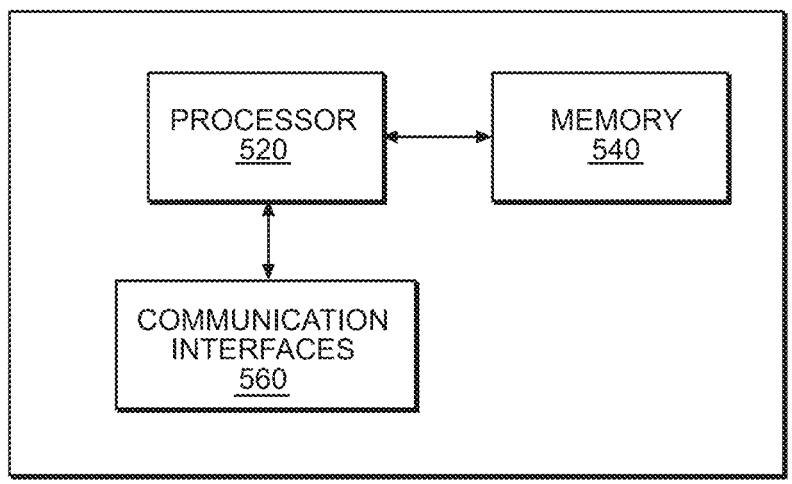
FIG. 4 illustrates an example embodiment of a network node at which a user plane function (UPF) and/or control plane function (CPF) may be implemented.

FIG. 4 illustrates an example embodiment of a network node at which a UPF and/or CPF may be implemented. The structure shown in FIG. 4 may also be representative of other network elements, such as ANs, CPEs, etc.

As shown, the network node includes: a memory 540; a processor 520 connected to the memory 540; various communication interfaces 560 connected to the processor 520. The various interfaces 560 may constitute a transceiver for transmitting/receiving data from/to other network elements (e.g., network nodes, routers, nodes, servers, BNGs, etc.). As will be appreciated, depending on the implementation of the network node, the network node may include many more components than those shown in FIG. 4. However, it is not necessary that all of these generally conventional components be shown in order to disclose the illustrative example embodiment. For example purposes, the example embodiment shown in FIG. 4 will be discussed with regard to a processor 520. However, it should be understood that the network node shown in FIG. 4 may include one or more processors or other processing circuitry, such as one or more Application Specific Integrated Circuits (ASICs).

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the network node (including UPF, CPF, MPF, etc.) to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 or other processing circuitry may be configured to carry out instructions of a computer program by performing the arithmetical, logical, and input/output operations of the system. Instructions may be provided to the processor 520 by the memory 540.

The various communication interfaces 560 may be wired and may include components that interface the processor 520 with the other input/output components. As will be understood, the various interfaces 560 and programs stored in the memory 540 to set forth the special purpose functionalities of the network node will vary depending on the implementation of the network node.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, BNGs, servers, ANs, CPEs, routers, or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network nodes, BNGs, servers, ANs, CPEs, routers, or other network elements, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A network element having a control plane function configured to communicate with a plurality of user plane functions, the network element comprising:
   at least one processor; and
   at least one memory including computer program code, the at least one memory and the computer program code configured to, with the at least one processor, cause the network element to
      designate, by the control plane function, a first user plane function, from among the plurality of user plane functions, as a designated broadcast forwarder from which to receive broadcast control traffic, and
      receive the broadcast control traffic forwarded from the first user plane function, from among the plurality of user plane functions.

2. The network element of claim 1, wherein the broadcast control traffic includes at least one of a broadcast session request or a broadcast session initiation packet.

3. The network element of claim 1, wherein the broadcast control traffic is received at each of the plurality of user plane functions.

4. The network element of claim 1, wherein the plurality of user plane functions are implemented at a plurality of line cards at one or more network nodes.

5. The network element of claim 1, wherein the at least one memory and the computer program code are configured to, with the at least one processor, cause the network element to designate the first user plane function by enabling, at the first user plane function, a control protocol redirection interface between the first user plane function and the control plane function.

6. The network element of claim 1, wherein the at least one memory and the computer program code are configured to, with the at least one processor, cause the network element to
   detect a failure at the first user plane function,
   designate a second user plane function, from among the plurality of user plane functions, as the designated broadcast forwarder in response to detecting the failure at the first user plane function, and
   receive subsequent broadcast control traffic forwarded from the second user plane function from among the plurality of user plane functions.

7. A network element having a control plane function configured to communicate with a plurality of user plane functions, the network element comprising:
   at least one processor; and
   at least one memory including computer program code, the at least one memory and the computer program code configured to, with the at least one processor, cause the network element to
      designate a first user plane function, from among the plurality of user plane functions, as a designated broadcast forwarder from which to receive broadcast control traffic by enabling, at the first user plane function, a control protocol redirection interface between the first user plane function and the control plane function,
      disable the control protocol redirection interface at each of the plurality of user plane functions other than the first user plane function, and receive the broadcast control traffic forwarded from the first user plane function, from among the plurality of user plane functions.

8. The network element of claim 7, wherein the broadcast control traffic includes at least one of a broadcast session request or a broadcast session initiation packet.

9. The network element of claim 7, wherein the broadcast control traffic is received at each of the plurality of user plane functions.

10. The network element of claim 7, wherein the plurality of user plane functions are implemented at a plurality of line cards at one or more network nodes.

11. The network element of claim 7, wherein the at least one memory and the computer program code are configured to, with the at least one processor, cause the network element to detect a failure at the first user plane function, designate a second user plane function, from among the plurality of user plane functions, as the designated broadcast forwarder in response to detecting the failure at the first user plane function, and receive subsequent broadcast control traffic forwarded from the second user plane function from among the plurality of user plane functions.

* * * * *